Patented Sept. 25, 1945

2,385,504

UNITED STATES PATENT OFFICE 2,385,504

SEPARATION OF AROMATIC AMINES FROM IRON SLUDGE

John Paul Goulding, Neshanic Station, N. J., assignor to American Cyanamid Company, New York, N. Y., a corporation of Maine No Drawing. Application June 12, 1942, Serial No. 446,778

8 Claims. (Cl. 260—582)

This invention relates to the production of amines; more particularly to an improved method of recovering and purifying primary aromatic amines produced by the reduction of nitro compounds with iron.

Many primary aromatic amines are produced by first forming a corresponding nitro compound and then reducing the nitro group to an amino group by using finely divided iron to carry out the reduction. This is a commonly used procedure in the commercial production of many aromatic amines; examples of which are such compounds as aniline, substituted anilines, toluidine, phenylene diamines, alpha-naphthylamine and the like.

In general, the reduction is readily carried out by adding the nitro compound to a mixture of a very dilute acid and the finely divided iron. In carrying out the reaction only a small fraction of the amount of acid corresponding theoretically with the amount of the amine produced is used and as a result most of the iron is transformed into iron oxides. After the reaction has been completed the iron oxide, the unreacted iron, the amine and the water form a sludge from which the amine must be recovered.

In the past the recovery of the amines from this sludge has presented considerable difficulty. The prior art has developed no simple, quick and efficient way of carrying out this recovery. The object of this invention, therefore, is to provide an improved method of separating the amine from the remaining constituents of this sludge.

Commercial practice has developed three general processes of isolating the amines from the iron sludge. One is by making an aqueous extraction of the amine from the other constituents. The second is by distilling off the amine, usually with steam, and the third is by extracting the amine with organic solvents. Each of these procedures has been tried in the past and each has been found to involve objectionable limitations or to offer procedural difficulties.

The first method, that of aqueous extraction, is obviously applicable only to water-soluble amines. However, the great majority of the amines are excluded since compounds of this type are not usually water-soluble. Among the many amines produced in commercial quantities which can not be recovered by aqueous extraction are aniline, substituted anilines, naphthylamines and the like.

Steam distilling the amine is the most commonly used procedure and gives satisfactory results with easily volatile amines such as aniline. It is not satisfactory, however, with amines such as alpha-naphthylamine, for example, which have a relatively high boiling point and require the use of superheated steam. The high temperature results in considerable decomposition of the amines with the corresponding lowering of the yield.

An additional difficulty is encountered because of the physical condition of the iron sludge residue remaining in the still. This sludge is pyrophoric and introduces a considerable fire hazard due to the tendency toward spontaneous combustion at the temperatures prevailing in the still. Still further difficulties are also caused by frothing in the still. The resultant entrainment of the reduction mixture usually necessitates a second and often a third distillation. In addition, there is a loss in yield due to an appreciable amount of the amine being held in the iron sludge in such a way that it can not be distilled off. Finally, the distilled product must still be dehydrated.

The third method, namely the extraction with organic solvents, also has proved unsatisfactory because the ordinary solvents for the amine form with the reduction mixture a stable emulsion from which the solution of the amine in the organic solvent can only be separated with great difficulty. Except for the unfortunate formation of these emulsions, the solvent-extraction method would be the most desirable since extraction procedures are generally simple, cheap and effective.

In order to obtain the benefits of the natural advantages of solvent extraction, several procedures for breaking these emulsions have been proposed and tried in the past. None of them proved wholly satisfactory. One proposal was to evaporate the reduction mixture in order to remove the water by evaporation under high vacuum prior to the solvent extraction. This method, however, in addition to the drawback of involving a long time cycle and a loss of amine, is also subject to most of the objections pointed out above in connection with separation by steam distillation.

Another procedure which has gained considerable favor has been to subject the reduction mixture to an azeotropic distillation with a water immiscible organic solvent. This enables the water to be removed and the resultant dehydrated mixture filtered to separate the iron and iron oxides from the organic solvent. While this procedure is a considerable improvement on any of the prior processes it is also subject to the disadvantage that a long time cycle is required. Furthermore, in many cases it is necessary to carry out the filtration while the solvent is heated and to extract the iron and iron oxide residue one or more times with a hot solvent in order to insure a complete recovery of the amine.

The process of the present invention is an improvement in the solvent-extraction method of recovery whereby the advantages of that process are retained without being subject to the normally-occurring disadvantages. Instead of attempting to evaporate the water from the reduction mixture before extraction or to carry out azeotropic distillation after extraction, the problem is solved by causing a direct separation of the amine in organic solvent from the iron sludge and other constituents in the aqueous phase of the emulsion normally resulting from an attempt to carry out a direct solvent extraction.

In general this desirable result is accomplished by increasing the specific gravity of the aqueous phase to such a degree that the aqueous and solvent phases separate readily into supernatant layers rather than form an emulsion. After the iron reduction has been carried out in the customary manner, a cheap water-soluble salt is added followed by an organic, water-immiscible, inert solvent for the amine. The iron and iron oxides settle in the lower layer and the upper layer comprises the organic solvent solution of the amine and may be drawn off in any desirable manner.

The choice of the solvent to be used is a very wide one. Any inert solvent for the amine which is not miscible with water and which is light enough to form an amine solution which will separate from and float on the aqueous salt solution may be used. Suitable solvents for use in the present process include hydrocarbons such as kerosene, benzene, toluene, ethylbenzene, xylenes, solvent naphtha, tetrahydronaphthalene; chlorinated hydrocarbons of sufficiently low specific gravity such as chlorobenzene; esters such as butylacetates, amylacetates; ethers such as anisole; nitriles such as benzonitrile; nitro compounds such as nitroethane, nitrobenzene and the like. These examples are only given by way of illustration and, as pointed out, the invention is limited only in that the solvent should be water immiscible and of a sufficiently low specific gravity.

The choice of the salt to be used for increasing the specific gravity of the aqueous phase is principally limited by economic consideration. Any salt which is sufficiently soluble in water to cause the necessary increase in specific gravity of the aqueous layer may be used. Sodium chloride is the simplest and cheapest salt and works very satisfactorily. However, also any of the nitrates, sulfates, carbonates, sulfites, thiosulfates, formates and the like of such metals as sodium, potassium, calcium, magnesium and the like or the ammonium salts may be used if they are available, sufficiently soluble and reasonably inexpensive.

It is preferable that the acid content of the reduction mixture be neutralized before carrying out the solvent extraction. However, this step is not essential. The quantity of acid present is so small that only a minor proportion of the amine is converted into its corresponding salt. Since most of the amine salts are also very readily hydrolyzed, no great difficulty is encountered even when the acid is not neutralized.

Isolation of the amine from the solvent forms no part of the present invention and may be carried out in any desirable manner. For example, the solution may be concentrated and the amine recovered by direct crystallization. Again, the solvent may be stripped off by distillation with steam. Another satisfactory procedure is to add a sufficient amount of acid to convert the amine into a corresponding salt which is insoluble in the solvent. If so desired, the solvent may be readily recovered and reused, thus adding to the overall efficiency of the process.

The present invention, therefore, produces a more satisfactory method of recovering the amines from the reduction mixture than was furnished by any of the procedures of the prior art. It is not limited to water-soluble amines. It does not involve a long distillation cycle. It does not subject the amine to high temperatures at which decomposition may take place. It does not require any extraction with hot solvents with the concurrent difficulties in handling. It requires no special apparatus. It is quick, cheap and efficient. As compared with the azeotropic distillation it is very simple.

While the invention is particularly useful with aromatic amines having high boiling points, for example, those having boiling points above about 210° C. under atmospheric pressure, it also may be advantageously applied to those amines of a lower boiling point which can be recovered with fair efficiency by other methods. It not only recovers these amines more quickly and cheaply than by other methods but does it in better yield. As compared with steam distillation, the product requires less reprocessing to obtain a pure form. There is no loss in yield due to the amine being held by the iron sludge as in the case of steam distillation. The method, however, is restricted to water insoluble amines. The term "water insoluble" when used in the present specification and claims is meant to include those amines having a solubility less than 5% at 20° C.

Examples of typical commercial amines to which the present invention is especially applicable are the isomeric xylidines, m- and p-chloroanilines, the dichloroanilines, particularly the important 2,5-dichloroaniline, the anisidines and phenetidines, chlorinated toluidines such as 2-methyl-5-chloroaniline, chlorinated alkoxy anilines such as 2-methoxy-5-chloroaniline, alpha-naphthylamine, etc. The invention is, however, not limited to these particular aromatic amines and as pointed out is equally applicable to lower boiling amines such as aniline, toluidines and the like.

*Example 1*

A mixture of 83 parts of iron filings, 250 parts of water and 8 parts of acetic acid was heated to 97–99° C., and held at that temperature while 63 parts of 2-nitroanisole were slowly added with brisk agitation over a period of 30 minutes. Stirring and heating were continued until reduction was complete. The mixture was then neutralized with 8 parts of anhydrous sodium carbonate. 75 parts of sodium chloride and 380 parts of chlorobenzene were successively added and after a short period of warming and stirring, the mixture was allowed to cool and settle. The supernatant chlorobenzene layer was separated from the lower aqueous layer and filtered. The hydrochloride of the o-anisidine was readily isolated by adding a slight excess of 23° Bé. hydrochloric acid to the chlorobenzene, allowing the precipitated hydrochloride to settle and then filtering.

Example 2

A mixture of 67 parts of iron filings, 150 parts of water and 7 parts of 23° Bé. hydrochloric acid was heated to 95° C. and 57.2 parts of 2-nitro-4-chlorotoluene added with stirring over a period of about 30 minutes. Heating and stirring were continued until the reaction was complete. The reduction mixture was neutralized with potassium carbonate and 50 parts of potassium chloride and then 260 parts of toluene added. After a short warming and stirring period the mixture was allowed to settle and cool and the supernatant toluene layer siphoned off. The hydrochloride of 2-amino-4-chlorotoluene was isolated easily by adding a slight excess of 23° Bé. hydrochloric acid to the toluene solution, allowing the precipitated hydrochloride to settle and collecting the salt by filtering.

Example 3

A mixture of 83.5 parts of iron filings, 250 parts of water and 8 parts of acetic acid was heated to 90° C. 71 parts of alpha-nitronaphthalene are added over ½ hour with continuous stirring. Stirring and heating were continued until reduction was complete. The reduction mixture was neutralized by 7½ parts of sodium carbonate. 75 parts of sodium chloride and then 380 parts of chlorobenzene were added. After stirring and warming for a short time the mixture was allowed to cool and settle. The supernatant chlorobenzene solution was decanted and the alpha-naphthylamine recovered easily from the solution by steam-distilling off the chlorobenzene.

Example 4

A mixture of 200 parts of iron filings, 525 parts of water and 20 parts of acetic acid was heated to 98–99° C. and 188 parts of 2-nitro-4-chloroanisole are added over one hour while the mixture was being stirred. The stirring and heating were continued until the reduction was complete. The mixture was neutralized with 17½ parts of anhydrous sodium carbonate and 150 parts of sodium chloride and then 1000 parts of chlorobenzene added. After a short period of warming and stirring the mixture was allowed to cool and settle. The upper layer, consisting of a chlorobenzene solution of 2-amino-4-chloroanisole, was separated from the lower aqueous layer and was clarified. The hydrochloride of the base was isolated by adding a slight excess of 23° Bé. hydrochloric acid. After the precipitated hydrochloride had settled it was collected by filtering.

Example 5

A mixture of 83 parts of iron filings, 250 parts of water and 7½ parts of 23° Bé. hydrochloric acid was heated to 97° C., and over a period of 30 minutes, 80 parts of 2,5-dichloronitrobenzene were stirred in. Stirring and heating were continued until the reduction was complete. The reduction mixture was made alkaline with sodium carbonate. 75 parts of sodium chloride and then 330 parts of monochlorobenzene were added. After stirring and warming for a short period, the mixture was allowed to cool and settle. The supernatant chlorobenzene solution was decanted and the hydrochloride of 2,5-dichloroaniline easily isolated by adding a slight excess of concentrated hydrochloric acid to the chlorobenzene solution, allowing the precipitated hydrochloride to settle and then filtering.

I claim:

1. The method of recovering water insoluble primary aromatic amines from a mixture of the amine and iron sludge resulting from the reduction of the corresponding nitro compound with iron which comprises adding a water soluble salt and a water immiscible, inert solvent for the amine, the solvent being so chosen that the resulting amine solution has a lower specific gravity than the aqueous salt solution containing the iron sludge, agitating the mixture, allowing the aqueous and solvent phases to separate into layers and the iron sludge to settle, collecting the solvent layer and isolating the amine from the separated solvent layer.

2. A method as in claim 1 in which the water soluble salt is sodium chloride.

3. The method of recovering a water insoluble primary aromatic amine having a boiling point above about 210° C. under atmospheric pressure from a mixture of said amine and the iron sludge resulting from the reduction of the corresponding nitro compound with iron which comprises adding a water soluble salt and a water immiscible inert solvent for the amine, the solvent being so chosen that the resulting amine solution has a lower specific gravity than the aqueous salt solution containing the iron sludge, agitating the mixture, allowing the aqueous and solvent phases to separate into layers and the iron sludge to settle, collecting the solvent layer and isolating the amine from the separated solvent layer.

4. A method according to claim 3 in which the amine is 2-methyl-5-chloroaniline.

5. A method according to claim 3 in which the amine is 2-methoxy-5-chloroaniline.

6. A method according to claim 3 in which the amine is alpha-naphthylamine.

7. The method of recovering water-insoluble primary aromatic amines from a mixture of the amine and iron sludge resulting from the reduction of the corresponding nitro compound with iron which comprises adding to said mixture a water-soluble salt and at least a sufficient amount of monochlorobenzene to dissolve the amine, agitating the resulting mixture, allowing the aqueous and monochlorobenzene phases to separate into layers and the iron sludge to settle, collecting the solvent layer and isolating the amine therefrom.

8. A method according to claim 7 in which the water-soluble salt is sodium chloride.

JOHN PAUL GOULDING.